UNITED STATES PATENT OFFICE.

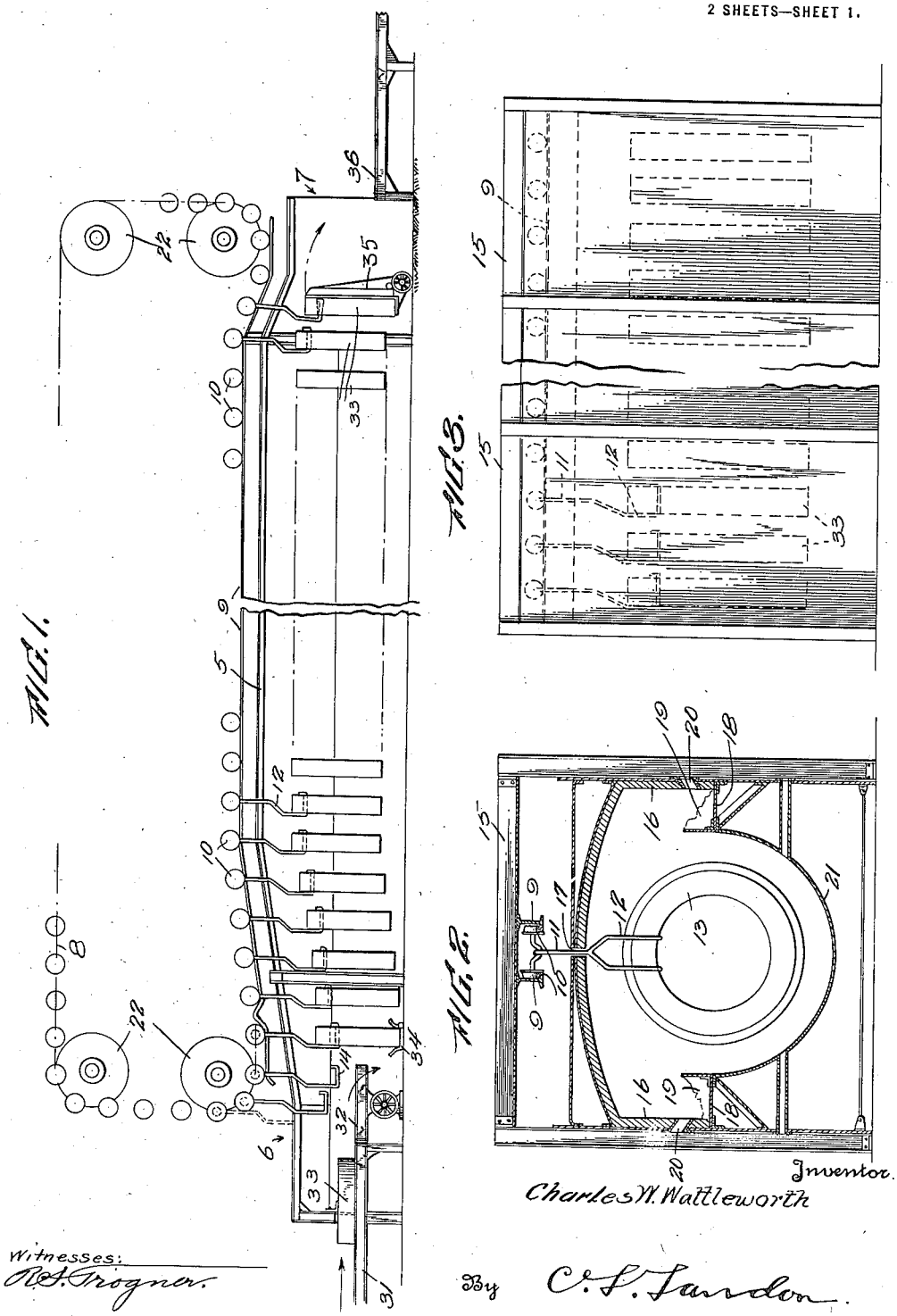

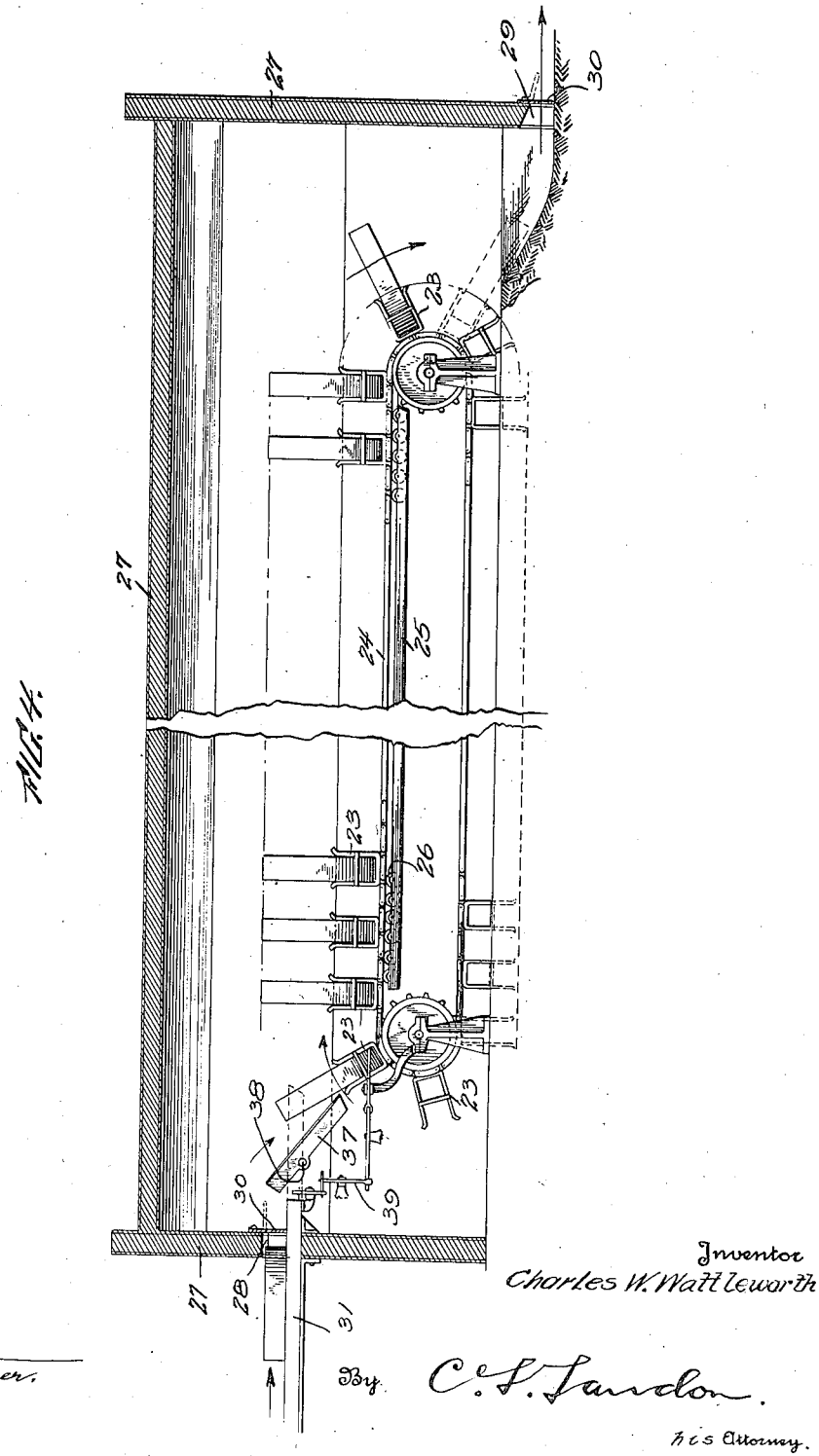

CHARLES W. WATTLEWORTH, OF AKRON, OHIO, ASSIGNOR TO THE GOODYEAR TIRE & RUBBER COMPANY, A CORPORATION OF OHIO.

APPARATUS FOR THE CONTINUOUS MANUFACTURE OF VEHICLE-TIRES.

1,320,812.     Specification of Letters Patent.     Patented Nov. 4, 1919.

Application filed August 17, 1917. Serial No. 186,758.

*To all whom it may concern:*

Be it known that I, CHARLES W. WATTLEWORTH, a subject of the King of Great Britain, residing at Akron, in the county of Summit and State of Ohio, have invented new and useful Improvements in an Apparatus for the Continuous Manufacture of Vehicle-Tires, of which the following is a specification.

My present invention relates to an apparatus for the continuous manufacture of vehicle tires, and more particularly, perhaps, to the continuous production of pneumatic tires.

According to the established system of tire manufacture, the green tire casings are built up upon cores which are placed within molds for vulcanization. Numbers of these molds are then piled upon the plunger of a hydraulic press which is employed to force the entire mass of molds against a fixed head, producing the pressure requisite to mate firmly and properly the parts of each mold. The molds are heated, while thus under pressure, to cure the contained casings.

The practical disadvantage of this uniformly employed system resides in the intermittent, non-continuous production of vulcanized tires by each press unit. The production may be termed spasmodic, and the press and mold equipment is not in uninterrupted use, even though each discharged press be immediately reloaded at the end of the curing period for any batch of molds. The first mold loaded on the press is not usefully employed, to all practical intents, until the last and topmost mold of the pile is loaded. This is also true of the unloading process, while the press itself remains idle during the whole of each charging or discharging period, (eighteen to twenty minutes) as far as its productive use is concerned.

The system for the vulcanization of tires provided by the present invention has been designed to avoid the delays consequent upon the practice of the present system, as well as to lighten the manual labor required in putting the system into actual use. This invention provides for the continuous vulcanization of successive tires of a constantly and uniformly moving series, such tires being subject to both vulcanizing heat and vulcanizing pressure in transit. Since the successive tire molds are to be individually heated, it will be apparent that the practical problems to be solved are concerned with the provision of means to heat and compress successive molds of a continuously moving string individually, uniformly, and with the minimum expenditure of time and of labor.

As a principal object, therefore, this invention contemplates the provision of an apparatus whereby each tire mold may be kept in constant use and may be successively loaded, compressed and cured, and unloaded without interruption, and without delay in the continuity of any of the processes upon a large number of the molds.

It is a further object of this invention to provide a vulcanizing apparatus for tire molds which will handle any desired number of molds in succession and which will provide for the individual compression of the parts of each mold and for a uniform vulcanizing heat while the molds are in transit between the loading point and the unloading point therefor.

It is a still further object of this invention to provide traveling means of an endless nature which will support the molds individually while they are being subjected to heat and pressure and which will carry the molds, during the curing time, from a point at which they are loaded on the traveling means to the point where they may be unloaded therefrom at the conclusion of the proper vulcanizing period.

In carrying out my invention I provide a traveling conveyer adapted to pass through an elongated or tunnel-like furnace, this conveyer carrying a plurality of arms upon which a succession of molds may be individually supported and passed through the furnace at such rate of speed that the proper amount of heat for the proper length of time may be secured for the article to be vulcanized, said mold being formed of self-contained, interlocking compression parts which do not require the application of external pressure for effecting their proper mating.

The above, and additional objects which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a side elevational view, essentially diagrammatical, of the apparatus provided for the carrying out of the system comprehended herein;

Fig. 2 is a cross-sectional view of the elongated heater;

Fig. 3 is a side elevational view of the heater; and

Fig. 4 is a vertical section taken through a modified form of the apparatus.

Broadly, this invention comprehends the curing of rubber goods while the molds containing them are in transit between a loading point, at which the cure is initiated, and an unloading point at which the cure is completed. The stationary hydraulic presses which have been in universal use are dispensed with entirely, and the objects which were gained by the use of such presses, namely the compression of the mold parts and the heating thereof to the proper temperature and for the proper length of time, are equally well accomplished by the present system of this invention, which also has to its credit great gains in productivity over the old method.

As has been explained, this invention is based upon the use of an elongated furnace or heating tunnel in which the desired temperatures are maintained and through which the molds are conveyed at a rate of speed so proportionate to the length of the tunnel that the desired heating period is secured therefor, while at the same time the equipment has a capacity for an endless stream of tire molds each of which is individually handled as regards the loading and unloading. In this manner the delay incident upon completing the cure of a score of molds simultaneously, as in one of the old presses, is obviated completely, since no one of the molds in the present system hinders the immediate handling of the following mold.

The apparatus employed in one embodiment of this invention, as shown in Figs. 1, 2 and 3, may include an elongated tunnel 5 which has a gateway at both ends and which links the loading point 6 with the unloading point 7. An endless conveyer 8 of any suitable construction is provided to enter and to traverse the tunnel between the loading and unloading points, returning over the tunnel in the manner illustrated. Supporting the conveyer along the roof of the tunnel, i. e., the portion of its length at which it is subjected to the weight of the heavy molds, is situated a trackway composed of rail members 9 between which are movable small trolleys 10, the latter forming elements of the conveyer and being connected in an endless series by any desirable link means or the like. Each trolley includes a suspension arm 11 which carries a mold-supporting yoke 12. The molds used for compression and formation of the annular tire carcasses are themselves annular and are readily supported upon bracket extremities 14 of each of the trolley yokes 12.

The trackway 9 for the conveyer may be supported upon transverse framing sections 15 which form the framework of the heating tunnel 5. In order to economize with respect to the amount of heat required to maintain the interior of the tunnel at its proper temperature the latter may be lined throughout with firebrick 16 or a similar material adapted to prevent the radiation of the interior heat of the tunnel. The embodiment illustrated in the cross-sectional view of Fig. 2 shows the fire brick constructed in the form of an overhead arch supported upon a wall lining, the center line of the arch being split or slotted as denoted by the numeral 17 to permit the support arms 11 to extend through from the trolleys moving above the arch. It is to be here pointed out, however, that the firebrick lining may be so constructed as to inclose the trackway 9 and the lower portion of the conveyer itself, should such construction appear desirable to obviate the slot 17 and thus provide a tunnel more impervious to the escape of heat.

The heating of the tunnel may be accomplished in the manner found best adapted to the requirements. As one good form, I have provided a pair of grates 18 which extend longitudinally of the tunnel, one grate on each side thereof. These grates are to be filled with refractory material (indicated at 19) and the latter is to be heated by the combustion of gas directed thereagainst by twyers 20 arranged to extend through the tunnel walls. Connecting the grates 18 on the opposite sides of the tunnel is a semi-cylindrical under wall 21 of such diameter as to closely surround the molds 13 and to confine the heat generated in the grates 18 in a manner that will secure the maximum effectiveness. Non-conducting air spaces surround the bottom of the grates 18 and the heat-confining wall 21, all precautions being taken to prevent the undue dissemination, or waste, of the heat. The main point with which this invention is at present concerned is, however, that the interior of the tunnel be heated to the desired temperature irrespective of the specific means employed to accomplish this necessary result.

The trolleys 10 are preferably grouped in an endless chain whose circuit may be outlined by the corner pulleys 22 in the manner illustrated in Fig. 1. On the other hand should it be desired that the tunnel contain the whole of the mechanism, a modified form of the apparatus, such as is disclosed in Fig. 4 may be employed.

In this figure the trolleys are dispensed with in favor of a plurality of saddle brackets 23 which are mounted upon a conveyer chain 24 located entirely within, and at the bottom of, the tunnel. In order to support the chain 24, when the molds are loaded into the transit saddles of the conveyer, I have provided a stationary bed member 25 in which are journaled, with their axles at right angles to the direction of travel of the chain 24, a plurality of roll elements 26. These rolls bear the weight of the molds carried by the chain, and at the same time offer no obstruction to the movement of the conveyer from the loading point to the unloading point of the tunnel. The latter is heated as desired and is constructed of a suitable heat proof material 27 for roof and end walls, the entire tunnel surface being unbroken with the exception of small doorways 28 and 29 provided in the end walls for the entrance and exit of the molds from the tunnel. These doorways may be closed by suitable flap doors 30, which may be readily displaced from their normally closed position to permit the passage of successive molds therethrough.

Any desired means may be resorted to in order to load the molds upon the traveling conveyers of these two embodiments of my invention. In the apparatus disclosed in Fig. 1, a stationary loading table 31 is built into the tunnel mouth at the point 6, and is terminated by a tilting table 32 which is so mounted as to transmit any entering mold 33 to a stationary saddle bracket 34 by the force of gravity, due to an overbalancing of the table 31 by the weight of the mold. As the slowly moving trolley yoke arms 12 of the conveyer pass through the tunnel, one trolley engages the mold and lifts it from the bracket 34, from whence it is carried throughout the length of the tunnel until it may be deposited upon a receiving table 35 adjacent to the removal point 7. This receiving table is also operated by the weight of the mold and is tiltable thereby into a position flush with the receiving platform 36 built into the rearward mouth of the tunnel.

Any suitable mold construction may be resorted to in order to provide for an interlocking of the mold parts in such a manner that the requisite pressure is acquired for the contained tire carcass. A desirable mold construction to accomplish this end is illustrated in my co-pending application filed herewith August 17, 1917, Serial No. 186,758.

In the form of apparatus disclosed in Fig. 4 the loading and removal of the molds upon and from the conveyer 24 is accomplished automatically. A tilting table 37 is mounted upon an off-center pivot 38 at the inward extremity of the loading platform, the latter being brought in through the entrance doorway of the heater tunnel. Trip means of any desirable nature, which have been diagrammatically indicated at 39, prevent movement of the table 37 about its pivot until one of the saddle brackets 23 has arrived at the suitable loading point with respect to such table. The trip is then automatically actuated by this moving bracket to release the table and thus permit the mold to be deposited within the waiting bracket by gravity. The tilting table is immediately returned to its horizontal position to receive a fresh mold to be loaded in the conveyer in a like manner, the trips being reset and automatically actuated by the moving chain of receiving brackets of the conveyer as before. At the unloading extremity of the conveyer the brackets are inverted, thus permitting the molds to be automatically removed by gravity, in order to issue from the rear doorway of the tunnel.

It will be apparent from the foregoing that an apparatus has been provided whereby the continuous and uninterrupted production of vulcanized tires may be accomplished. The length of the heating tunnel is to be so calculated that the requisite curing period may be readily attained, variations of this curing period being secured through corresponding variations of the rate of travel of the mold supporting conveyer, in any modification of the invention.

What I claim is:

1. A vulcanizing apparatus comprising in combination a casing, means for heating the chamber within said casing, a conveyer for conveying molds which are adapted to contain the articles to be vulcanized, from one end of said casing to the other end thereof, and means, automatically operated by the weight of the individual molds, for delivering said molds into a position to be picked up by said conveyer.

2. A vulcanizing apparatus comprising in combination a casing, means for heating the chamber within said casing, a conveyer for conveying molds which are adapted to contain the articles to be vulcanized, from one end of said casing to the other end thereof, means for delivering said molds into a position to be picked up by said conveyer, and means, automatically operated by the weight of the individual molds, for freeing said molds from said conveyer.

3. A vulcanizing apparatus comprising in combination a casing, means for heating the chamber within said casing, a conveyer for conveying molds which are adapted to contain the articles to be vulcanized, from one end of said casing to the other end thereof, means for delivering said molds into a position to be picked up by said conveyer, means, automatically operated by the weight of the individual molds, for freeing said molds from said conveyer, and means for depositing said molds in a position accessible for removal.

4. A vulcanizing apparatus comprising in combination a casing, means for heating the chamber within said casing, a conveyer for conveying molds which are adapted to contain the articles to be vulcanized, from one end of said casing to the other end thereof, means, automatically operated by the weight of the individual molds, for delivering said molds into a position to be picked up by said conveyer, and means, automatically operated by the weight of the individual molds, for freeing said molds from said conveyer.

5. A vulcanizing apparatus comprising in combination a casing having an entrance and an unloading point, means for heating the chamber within said casing, means for conveying molds which are adapted to contain the articles to be vulcanized, from one end of the casing to the other end thereof, means at the entrance of said casing for changing the relative position of said molds, whereby they are picked up by said conveying means and conveyed to the unloading point.

6. A vulcanizing apparatus comprising in combination a casing having an entrance and an unloading point, means for heating the chamber within said casing, means for conveying molds which are adapted to contain the articles to be vulcanized, from one end of the casing to the other end thereof, means at the entrance of said casing for changing the relative position of said molds, whereby they are picked up by said conveying means, and means near the unloading point for returning said molds to their original relative position.

7. A vulcanizing apparatus comprising in combination a casing having an entrance and an unloading point, means for heating the chamber within said casing, means for conveying molds which are adapted to contain the articles to be vulcanized, from one end of the casing to the other end thereof, means at the entrance of said casing for automatically turning said molds from a horizontal position to a vertical position, said turning means being operated by the weight of the individual molds, and whereby said molds are picked up by said conveying means.

8. A vulcanizing apparatus comprising in combination a casing having an entrance and an unloading point, means for heating the chamber within said casing, means for conveying molds which are adapted to contain the articles to be vulcanized, from one end of the casing to the other end thereof, means at the entrance of said casing for automatically turning said molds from a horizontal position to a vertical position, said turning means being operated by the weight of the individual molds, and whereby said molds are picked up by said conveying means, and means near the unloading point also operated by the weight of the individual molds, whereby they are returned from a vertical position to their original horizontal position.

In testimony whereof I have signed my name in the presence of two subscribing witnesses.

CHARLES W. WATTLEWORTH.

Witnesses:
B. J. McDanel,
R. S. Trogner.